June 24, 1969  A. J. TUCKER  3,451,732
MOLDED ROLLER POST
Filed Feb. 28, 1966
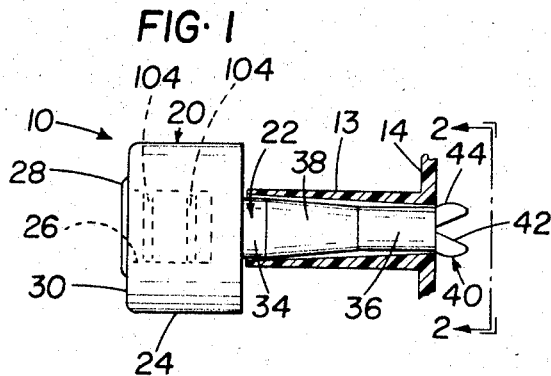
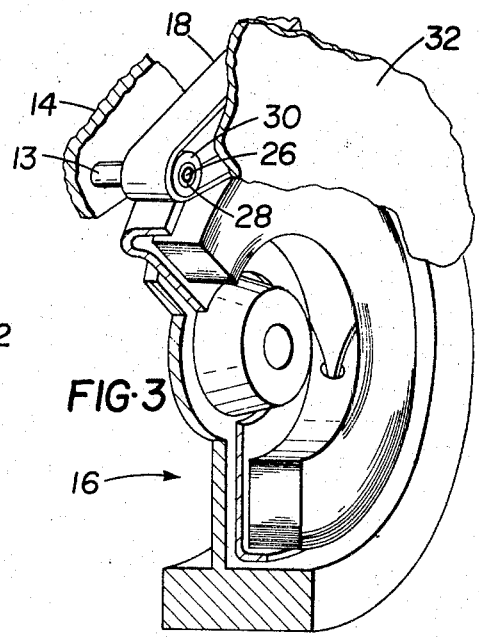
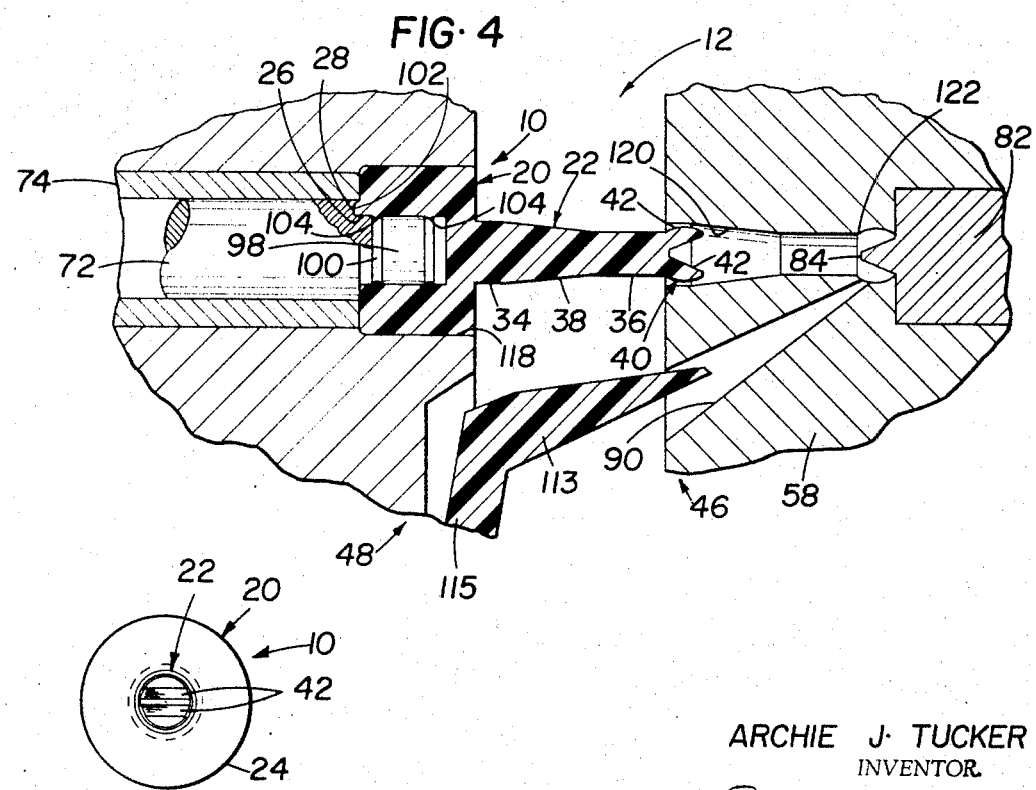
ARCHIE J. TUCKER
INVENTOR.
BY Robert W. Hampton
Malcolm G. Dunn
ATTORNEYS June 24, 1969    A. J. TUCKER    3,451,732
MOLDED ROLLER POST Filed Feb. 28, 1966    Sheet 2 of 3

ARCHIE J. TUCKER
INVENTOR.

BY Robert W. Hampton
   Malcolm G. Dunn

ATTORNEYS

United States Patent Office 3,451,732
Patented June 24, 1969

3,451,732
MOLDED ROLLER POST
Archie J. Tucker, Rochester, N.Y., assignor to Eastman Kodak Company, Rochester, N.Y., a corporation of New Jersey
Filed Feb. 28, 1966, Ser. No. 530,598
Int. Cl. F16c *13/00, 39/00, 35/00*
U.S. Cl. 308—15    4 Claims

ABSTRACT OF THE DISCLOSURE

A roller post adapted to be rotatably supported in a bearing aperture extending through a wall member to guide and/or snub a strip of material moving relative to said wall member comprises a roller head the periphery of which the strip material engages, a stem or body portion which extends axially from the roller head for insertion thorugh a bearing aperture in the wall member to rotatably support the roller post in said wall member, and a snap-in element on the end of the stem opposite said roller head which is compressed to allow the stem to be inserted through said bearing aperture, and which extends to its original diameter to retain the roller post in assembled position in the bearing aperture.

---

This invention relates to a molded article, and specifically to a roller post which can be readily assembled in a bearing aperture in a supporting wall.

The roller post of the invention is intended to freely rotate in the opening of a wall structure such as a film or tape cartridge. The roller post guides and is rotatably engaged by flexible strip material as the strip material passes around the roller head portion of the roller post, and snubs any undesired erratic motion that may be transmitted along the length of the strip material due to intermittent operations affecting the movement of the strip material. U.S. Patents 3,208,685 and 3,208,686 each disclose a film cartridge in which such roller posts is used.

An object of the invention, accordingly, is to provide a molded roller post having a roller head over the roller surface of which the flexible strip material passes; a stem or body portion which extends concentrically from the roller head for insertion through the opening of the wall structure; at least one bearing surface on the stem for supporting the roller post for free rotation in the opening of the wall structure; and a snap-in element at the end of the stem which is cammed inwardly of itself by the wall structure opening, and which fans out to its original diameter greater than the diameter of the stem adjacent thereto to aid in retaining the roller post in assembled position in the wall structure opening.

The roller post has a tapered stem to facilitate molding and assembly in the film cartridge described in either of U.S. Patents 3,208,685 and 3,208,686. As a result of this taper, there is sometimes a tendency for the roller post to ride axially outwardly from its inserted position in the film cartridge. This tendency may occur at the start of each strip material feeding operation. In order to prevent any possible bind in the roller post when it does ride axially outwardly the stem is made long enough to allow a certain amount of end play. The wall of the film cartridge opposite the wall structure in which the roller post is inserted is closely adjacent the end face of the roller head of the roller post. Such end play may occasionally bring the end face of the roller head into engagement with this wall; therefore it is essential that any interference with the rotation of the roller post be minimized so that the roller post is free to be rotated by the flexible strip material as the strip material passes over the roller post.

Accordingly, still another object is to provide on the end face of the roller head of the roller post an annular lip which reduces the area of frictional contact between the end face and the adjacent film wall, and which forms a roller bearing surface in its engagement with the cartridge wall.

It is essential that the roller head be smoothly formed to fulfill its function and so that there will be no injury to the flexible strip material nor any interference with its passage over the roller head. It is also essential that the bearing surface on the stem be smoothly formed to fulfill the described function of free rotation of the roller post. In injection molding, a material, such as a thermoplastic, is heated to a flowable state and then forced into cavities of a mold through the sprue, runners and tunnel gates by means of an injection ram. When the molded material in the cavities has cooled the resulting molded articles are ejected along with the sprue, runners and tunnel gates which are separated from the articles by breaking or snapping. Often a rough surface remains on the article at the location of this separation. If the rough surface should interfere in any manner with the use of the article it is then necessary to make the surface smooth by some suitable operation. This operation is time consuming and adds to the cost of production. This operation becomes increasingly more difficult if not impossible if the size of the article, as in the case of the roller post under consideration, should be less than an inch in length. It is further essential that the snap-in element at the end of the stem remote from the roller head be designed to be flexibly cammed inwardly of itself by the wall structure opening as the stem and snap-in element are inserted through the wall structure opening, and the surfaces of the snap-in element must be smooth to allow ready insertion through the opening. This is all accomplished by molding the roller post in such manner that the tunnel gate, through which the thermoplastic composition passes into the mold cavity, only goes to the portion of the cavity forming the snap-in element and to that area adjacent the cam-like surface on the snap-in element which is wiped smooth when the roller post is ejected from the mold.

Other objects inherent in the character of the invention described will become apparent to those skilled in the art to which the invention pertains.

In the drawings which form a part of the disclosure of this invention:

FIG. 1 is an elevation view of the roller post of the invention as assembled in the opening of a bearing;

FIG. 2 is a view taken along line 2—2 of FIG. 1, only of the roller post;

FIG. 3 is a perspective view, partially in section, illustrating the roller post in assembled position in the wall of a cartridge construction;

FIG. 4 is an elevation view in cross section of the roller post within the mold and as it is being ejected from one of the mold halves with a portion of the arbor being broken away;

Figure 5:
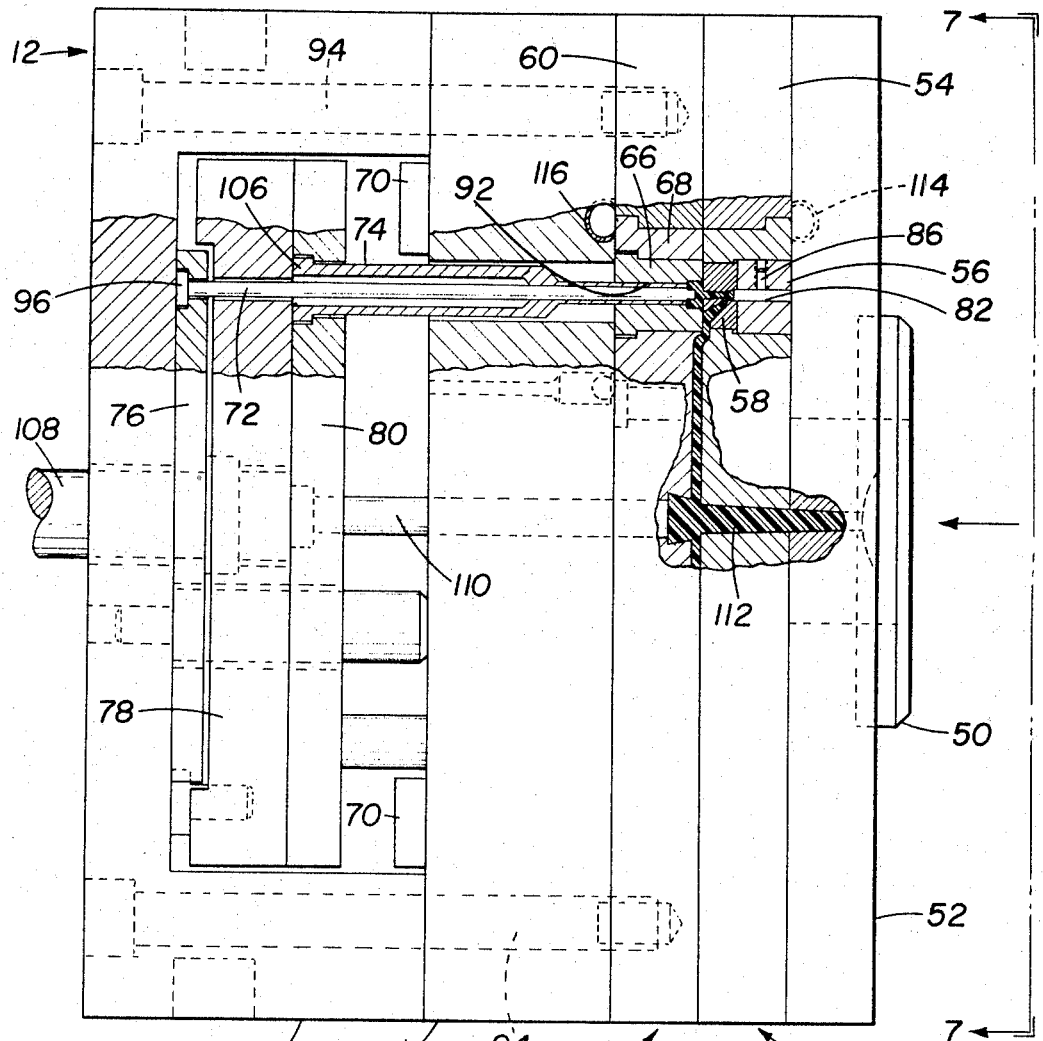
FIG. 5 is an elevational view, partly in cross section, of the mold.
Figure 6:
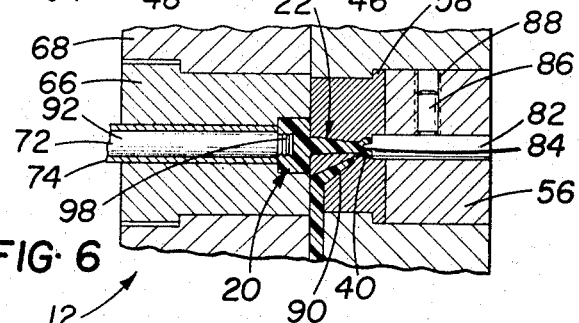
FIG. 6 is an enlargement of a portion of the mold illustrated in FIG. 5 and illustrates the roller post, runner and tunnel gate as they are located within the mold.
Figure 7:
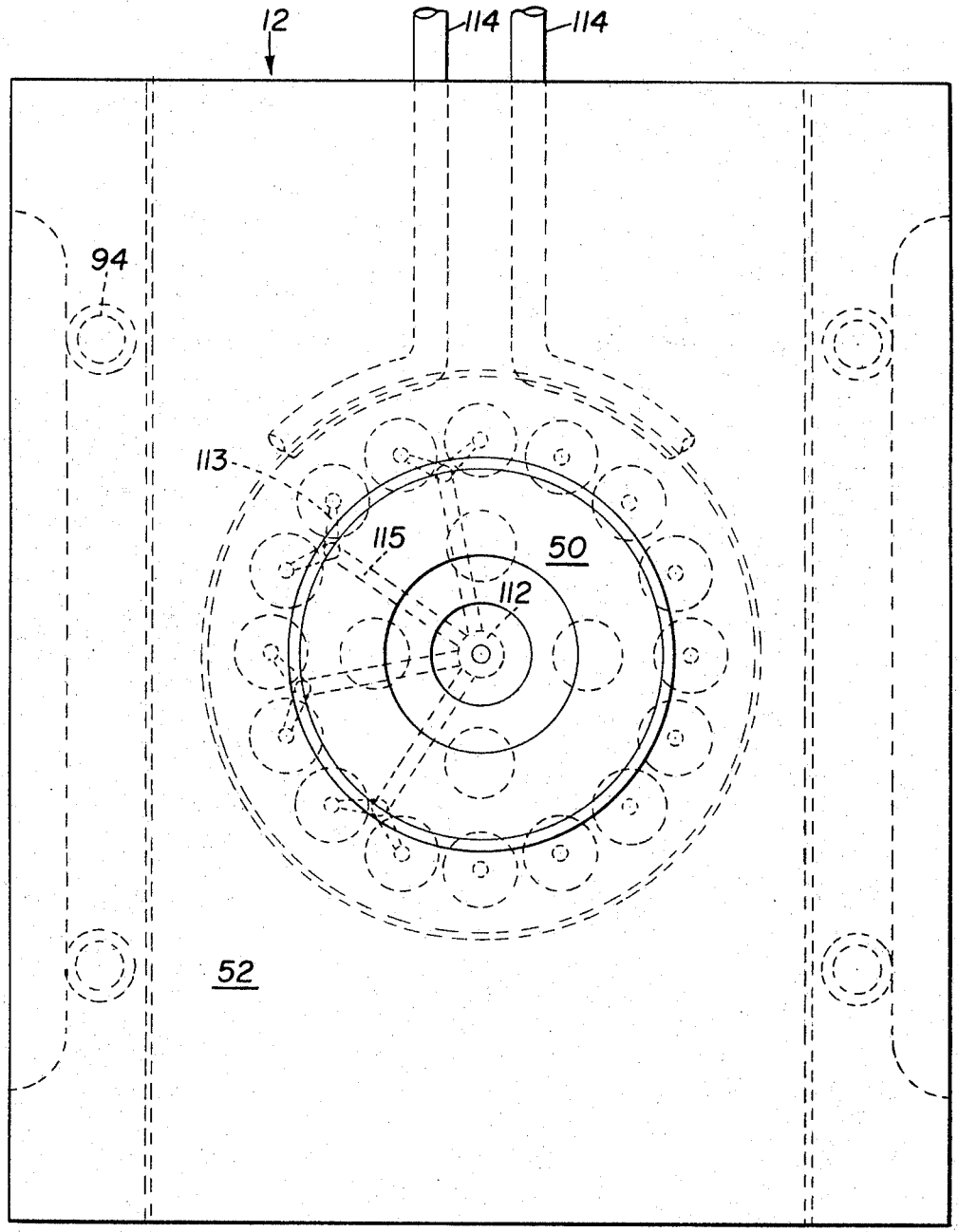
FIG. 7 is a view taken along lines 7—7 of FIG. 5.

Referring to the drawings, a roller post 10 (FIG. 1) is formed in mold 12 (FIGS. 4, 5, 6 and 7), preferably from acetate butyrate. The roller post is arranged for snap-in assembly in the bearing 13 in a wall structure such as the wall 14 of cartridge 16 (FIG. 3), which receives strip material 18. The roller post, as assembled in the cartridge is freely rotatable to guide and snub the strip material as the material passes thereover.

The roller post 10 has a roller head 20 and a stem 22 integrally connected to the roller head and extending axially from the head.

The roller head 20 has a cylindrical smooth roller surface 24 over which the strip material passes; a cored opening 26 extending coaxially into one end of the roller head; and an annular lip 28 on the end face 30 bordering the opening and forming a roller bearing surface when in engagement with the wall 32 opposite the cartridge wall 14. The purpose of the cored opening 26 will be discussed later.

Stem 22 is inserted into the bearing 13 of the cartridge wall 14; preferably has a pair of bearing surfaces 34, 36 spaced from each other by intermediate portion 38 of the stem, which tapers axially inwardly along its length from bearing surface 34 to bearing surface 36; and the extremity of the stem is provided with a snap-in element 40 which fans out to a diameter greater than the diameter of the stem portion adjacent thereto and which is depressed or cammed inwardly of itself during withdrawal of the stem 22 from the mold 12 (FIG. 4) and for assembly in the cartridge 16 (FIG. 3). The snap-in element may be formed by bifurcating the extremity of the stem to form a pair of fins 42.

The fins 42, being not only of greater diameter than the adjacent stem portion but also of the cartridge wall bearing 13, retain the roller post 10 in assembled position in the cartridge wall bearing and prevent the roller post from being withdrawn from bearing 13 during normal use. Cam-like surfaces 44 are provided on the fins and engage with the inside surface of the bearing 13 as the stem 22 of the roller post is inserted in one end of the bearing so that the fins are depressed or cammed inwardly of themselves until the fins emerge from the opposite end of the bearing 13.

The description of the mold for forming the roller post, and the operation of the mold will now be described. The particular mold illustrated is a multicavity mold capable of forming sixteen roller posts at the same time. The scope of the invention is not to be understood, however, as being limited to how many roller posts can be made at the same time, since many more or fewer posts could be made in accordance with the concepts of this invention as desired.

The mold 12 is in two major parts, a fixed section 46 and a movable section 48. The fixed section is affixed to the stationary portion of the molding apparatus (not shown), and the movable section is affixed to the portion of the molding apparatus (not shown) which reciprocates periodically with the molding operation.

The fixed section includes a clamping ring 50, a right-hand clamp plate 52, and a right-hand force plate 54. The right-hand force plate includes, for each cavity, a back-up block, or pin holder 56 and a stem cavity block 58.

The movable section 48 includes a left-hand force plate 60, a support plate 62, and an ejector housing 64. The left-hand force plate includes, for each cavity, a roller head cavity block 66 and a left-hand force block 68. The support plate 62 has limiting blocks 70 affixed thereto. The ejector housing 64 has operably connected thereto at least one arbor 72 and stripper sleeve 74 for each roller post being formed with each molding operation, and includes an arbor retainer plate 76, an ejector plate 78 and a stripper sleeve retainer plate 80.

Each back-up block or pin holder 56 supports a pin 82 extending axially through this block and partially into the stem cavity block to close one end of the stem cavity. The pin has a wedge 84 which forms the opening between the bifurcated fins 42 of the roller post stem. The pin and the wedge are held in proper position relative to the roller post stem by the set screw 86 which abuts the pin at right angles through a bore 88 made in one side of the back-up block or pin holder.

The stem cavity block 58 also contains the cavity for the tunnel gate 90 through which the hot thermoplastic composition is forced into the stem cavity.

In the movable section 48 of the mold 12 one end of each roller head cavity block 66 contains the cavity for the roller head, and a central bore 92 extending through the axis of this block is designed to receive one end of the arbor 72 and stripper sleeve 74 which surrounds the arbor. The latter two elements will be further discussed in the description of the ejector housing 64.

The ejector housing 64 is secured to the support plate 62 and left-hand force plate 60 of the movable mold section 48 by suitable means such as the bolts 94 shown in the drawing. The housing contains the operative parts of the movable mold section for controlling the movement of the stripper sleeve 74 relative to the arbor 72 for ejecting the molded roller post 10.

The arbor 72 is held by its head 96 in the arbor retainer plate 76, the plate being suitably secured at one end to one end of the ejector housing. The main body portion of the arbor extends from the ejector housing through the stripper sleeve 74.

A short end section 98 of the arbor, reduced in diameter from the main body portion, projects beyond the end of the stripper sleeve into the roller head cavity to form the cored hole 26 in the molded roller head 20. This short end section aids in providing dimensional stability to the molded roller head, since without the end section a roller head formed entirely and solidly of a thermoplastic composition such as acetate butyrate may shrink or sag along the periphery of its roller surface 24 upon cooling.

This short end section 98 of the arbor 72 also has two continuous grooves 100 formed in the surface around its periphery, and an annular recess 102 is formed in the end face of the main body portion of the arbor adjacent the base of the short end section. When the thermoplastic composition is extruded into the roller head cavity around this end of the arbor, annular rings 104 are formed in the interior wall surface of the cored hole of the roller head 20 by the continuous grooves 100 on the arbor 72, and the annular lip 28 is formed on the end face 30 of the roller head by the annular recess 102 adjacent the base of the short end section. The annular rings 104 are known as "puller rings" and aid in retaining the roller post on the arbor end section 98 during the first part of the ejection operation when the stem 22 and snap-in element 40 are pulled from the stem cavity block 58. During the second part of the ejection operation when the stripper sleeve 74 is operated to eject the roller post 10 from the arbor 72, the molded annular rings 104 are so formed and rounded at their periphery, and the character of the thermoplastic material is such as to permit flexure of the annular rings to release the short end section 98 of the arbor 72 from the roller head 20.

The stripper sleeve 74 is held by its head 106 in the stripper sleeve retainer plate 80. The main body portion of the stripper sleeve extends from the ejector housing and through the support plate 62 and the roller head cavity block 66 to form part of the wall abutting the end face 30 of the roller head 20. The stripper sleeve extends around and along a substantial length of the arbor 72, and the arbor, the support plate 62 and the left-hand force block 68 are reciprocally movable relative to the stripper sleeve 74 for the purpose of ejecting the molded roller post 10 from the roller head cavity and the short end section 98 of the arbor.

The ejector housing 64 and arbor retainer plate 76 are moved relative to the ejector plate 78 and the stripper sleeve retainer plate 80 when the knock-out bar 108, which is connected to the ejector plate, comes into engagement with a fixed portion (not shown) on the molding apparatus. As the mold section 48 continues to move, the ejector housing 64 and arbor retainer plate 76 move relative to the ejector plate 78 and stripper sleeve retainer plate 80 until the limiting blocks 70 which are affixed to the support plate 62 abut the stripper sleeve retainer plate. The resulting relative movement between the stripper sleeve and the arbor forces the roller post 10 off the arbor and out of the roller head cavity for ejection from the molding apparatus.

A knock-out pin 110 centrally located in the movable mold section 48 along its axis is secured in the stripper sleeve retainer plate 80. The relative movement between the pin 110 on the one hand and the support plate 62 and left-hand force block 68 on the other hand ejects the sprue portion 112, tunnel gate portion 113, and runner portion 115 of the multiple roller posts being molded with each molding operation.

Cooling tubes 114 and 116 carrying a suitable coolant such as water are provided in the fixed section 46 and the movable section 48 of the mold 12 to cool the area adjacent the molded roller post 10 to facilitate speed of ejection. The cooling tubes 114 in the fixed section are located in the right-hand clamping plate 52, and the cooling tubes in the movable section are located in the support plate 62.

The molding operation is as follows:

The movable section 48 of the mold 12 is moved by the molding apparatus (not shown) into engagement with the fixed section 46 of the mold so that the roller head cavity 118 and stem cavity 120 (FIG. 4) are in axial alignment. The thermoplastic composition is forced through the sprue 112 into the tunnel gate 90 and into the two aligned cavities through one of the bifurcated fin areas of the stem cavity. Fluid passes through the cooling tubes 114, 116 to dissipate the heat from the area around the cavities so that the molded roller post 10 will be sufficiently hardened to withstand subsequent ejection operations.

The movable mold section 48 is moved away from the fixed section 46 pulling the stem portion of the roller post out of the stem cavity block 58 in the fixed section 46 of the mold 12. The bifurcated fins 42 of the roller post 10 are pulled through an opening 122 (FIG. 4) in the stem cavity block of smaller diameter than the diameter of the fins.

The movable mold section 48 continues on its backward reciprocation carrying with it the arbor 72 and stripper sleeve 74, and as the knock-out bar 108 comes into abutment with a fixed portion (not shown) of the molding apparatus, the ejector plate 78 and stripper sleeve retainer plate 80 are constrained against further movement while the remaining structure of the movable mold section continues to move causing the ejection of the roller head 20 until the limiting blocks 70 abut the face of the stripper sleeve retainer plate. The stripper sleeve 74 forces the roller head away from the end section 98 of the arbor 72 within the cored opening 26 of the roller head.

At the same time of the relative movement of the stripper sleeve the sprue knock-out pin 110 is held stationary by the constrained stripper sleeve retainer plate 80 so that as the remainder of the movable mold section 48 continues its leftward movement the sprue 112 is forced out of the end of the movable mold section.

It will now be recognized from the foregoing description that some of the benefits of this method of molding the roller post over other possible methods are the ultimate simplicity of design of the mold, and the assurance that the roller head has a smooth roller surface over which the flexible strip material may pass without injury or obstruction. The roller post itself may be readily assembled in the bearing of a wall structure, yet will be retained in the bearing for its normal intended use.

Although the foregoing description relates to a specific embodiment of the invention, it is obvious that variations and modifications thereof can be effected within the spirit and scope of the invention.

I claim:
1. A roller post mounted to rotate freely in an elongated bearing aperture formed in a supporting member and having axially spaced bearing surfaces, said post comprising:
  a roller head having a strip material guiding surface on its periphery;
  a stem extending axially from said roller head and provided with a first bearing surface adjacent said roller head and a second bearing surface axially spaced from said first bearing surface so as to be rotatably supported within said bearing aperture by direct engagement between the bearing surfaces on said stem with the bearing surfaces in said bearing aperture;
  and a resiliently deformable snap-in element on the end of said stem opposite said roller head adjacent said second bearing surface and having an initial diameter greater than said second bearing surface and the portion of the bearing aperture directly engaged thereby;
  said snap-in element being formed so as to be cammed inwardly of itself as it is inserted axially through the bearing aperture and, after insertion, expanding to its initial diameter to retain said roller post in said bearing aperture while allowing free rotation thereof.
2. A roller post as defined in claim 1, including:
  an intermediate section on said stem connecting said first and second bearing surfaces,
  said first bearing surface adjacent said roller head having a diameter less than that of said roller head,
  and said second bearing surface adjacent said snap-in element having a diameter less than said first bearing surface and said snap-in element,
  said intermediate section tapering axially inward along its length from said first bearing surface to said second bearing surface to permit axial insertion of said stem through said bearing aperture and to space it from said bearing aperture to minimize frictional contact between the stem and said bearing aperture.
3. A roller post as defined in claim 1, said roller head having an integral annular lip extending axially from its end face within and in concentric relation to the guiding surface of said roller head.
4. A roller post as defined in claim 3, and in combination with a cartridge having at least one strip matrial receiving chamber defined in part by a pair of opposed side walls wherein said bearing aperture through which said roller post is inserted is located in one of said side walls and said annular lip on said roller post forms a roller bearing surface with the opposed side wall when in engagement therewith.

References Cited

UNITED STATES PATENTS

| 2,942,748 | 6/1960 | Anderson | 85—5 X |
| 3,054,546 | 9/1962 | Filipowicz | 226—194 |
| 3,078,064 | 2/1963 | Turnbull | 85—5 X |
| 3,107,947 | 10/1963 | Hulterstrum | 308—238 X |
| 3,112,547 | 12/1963 | Poe | 85—5 X |
| 3,164,418 | 1/1965 | Biesecker | 85—5 X |
| 3,243,237 | 3/1966 | Sprecher | 308—3.8 |
| 3,285,610 | 11/1966 | Shields | 226—194 X |
| 3,231,300 | 1/1966 | Moroney | 308—15 |
| 3,299,737 | 1/1967 | Hurlin | 308—15 |
| 3,343,204 | 9/1967 | Ford | 308—15 |
| 3,215,476 | 11/1965 | Jacobs | 308—15 |
| 2,446,872 | 8/1948 | Ehlers. | |
| 1,997,074 | 4/1935 | Novoty | 264—328 X |

MARTIN P. SCHWADRON, Primary Examiner.

FRANK SUSKO, Assistant Examiner.